United States Patent
Lu et al.

(10) Patent No.: US 11,341,961 B2
(45) Date of Patent: May 24, 2022

(54) MULTI-LINGUAL SPEECH RECOGNITION AND THEME-SEMANTEME ANALYSIS METHOD AND DEVICE

(71) Applicant: NATIONAL CHENG KUNG UNIVERSITY, Tainan (TW)

(72) Inventors: Wen-Hsiang Lu, Tainan (TW);
Chun-Yu Chien, Yunlin County (TW);
Shao-Chuan Shen, Taipei (TW);
Wei-Cheng Yeh, Taoyuan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 226 days.

(21) Appl. No.: 16/701,002

(22) Filed: Dec. 2, 2019

(65) Prior Publication Data

US 2021/0166681 A1  Jun. 3, 2021

(51) Int. Cl.
*G10L 15/187* (2013.01)
*G10L 15/22* (2006.01)
*G10L 15/01* (2013.01)
*G10L 15/18* (2013.01)

(52) U.S. Cl.
CPC ............ *G10L 15/187* (2013.01); *G10L 15/01* (2013.01); *G10L 15/1815* (2013.01); *G10L 15/22* (2013.01); *G10L 2015/223* (2013.01)

(58) Field of Classification Search
CPC ....... G10L 15/01; G10L 15/22; G10L 15/187; G10L 15/1815; G10L 2015/223
See application file for complete search history.

(56) References Cited

U.S. PATENT DOCUMENTS

| | | | |
|---|---|---|---|
| 6,839,669 B1* | 1/2005 | Gould | G10L 15/22 704/246 |
| 10,332,508 B1* | 6/2019 | Hoffmeister | G06N 3/084 |
| 2003/0088399 A1* | 5/2003 | Kusumoto | H04N 21/42203 704/E15.044 |
| 2007/0055514 A1* | 3/2007 | Beattie | G10L 15/08 704/235 |
| 2007/0225983 A1* | 9/2007 | Maringo | G10L 15/26 704/270 |
| 2013/0018649 A1* | 1/2013 | Deshmukh | G06F 40/247 704/9 |

(Continued)

*Primary Examiner* — Huyen X Vo
*Assistant Examiner* — Athar N Pasha
(74) *Attorney, Agent, or Firm* — Maschoff Brennan

(57) ABSTRACT

A multi-lingual speech recognition and theme-semanteme analysis method comprises steps executed by a speech recognizer: obtaining an alphabet string corresponding to a voice input signal according to a pronunciation-alphabet table, determining that the alphabet string corresponds to original words according to a multi-lingual vocabulary, and forming a sentence according to the multi-lingual vocabulary and the original words, and comprises steps executed by a sematic analyzer: according to the sentence and a theme vocabulary-semantic relationship data set, selectively executing a correction procedure to generate a corrected sentence, an analysis state determining procedure or a procedure of outputting the sentence, outputting the corrected sentence when the correction procedure successes, and executing the analysis state determining procedure to selectively output a determined result when the correction procedure fails.

17 Claims, 9 Drawing Sheets

(56) References Cited

U.S. PATENT DOCUMENTS

| | | | |
|---|---|---|---|
| 2014/0222417 A1* | 8/2014 | Lu | G06F 40/40 |
| | | | 704/9 |
| 2015/0255069 A1* | 9/2015 | Adams | G06F 40/263 |
| | | | 704/236 |
| 2017/0024465 A1* | 1/2017 | Yeh | G10L 25/54 |
| 2017/0032779 A1* | 2/2017 | Ahn | G10L 15/063 |
| 2020/0092607 A1* | 3/2020 | Rechner | H04N 21/234336 |
| 2020/0107078 A1* | 4/2020 | Ganapathy | H04N 21/4394 |
| 2020/0126534 A1* | 4/2020 | Yoo | G10L 15/16 |

* cited by examiner

| Initial (voiceless/voiced) | Bilabial | Labiodental | Alveolar | Post-alveolar ~ Retroflex | Alveolo-palatal | Velar | Glottal |
|---|---|---|---|---|---|---|---|
| Nasal | / [m] m | | / [n] n | | / [ɲ] gn | / [ŋ] ng | ✗ |
| Unaspirated stop | [p] p / [b] b | | [t] t / [d] d | | | [k] k / [g] g | [ʔ] (None) / ✗ |
| Aspirated stop | [pʰ] ph | | [tʰ] th | | | [kʰ] kh | |
| Unaspirated affricate | | | [ts] ts / [dz] dj | [tʃ]~[tʂ] tsr | [tɕ] tsc / [dʑ] djz | | |
| Aspirated affricate | | | [tsʰ] tsh | [tʃʰ]~[tʂʰ] tsrh | [tɕʰ] tsch | | |
| Fricative | | [f] f / [v] v | [s] s / [z] j | [ʃ]~[ʂ] sr / [ʒ]~[ʐ] jr | [ɕ] sc / [ʑ] jz | [x] h | [h] h |
| Approximant | | | | / [ɻ] (None) | / [j] i | | |
| Rounded approximant | | | | | / [ɥ] y | / [w] u | |
| Lateral approximant | ✗ | ✗ | / [l] l | | | | ✗ |
| Lateral approximant ~ Tap | ✗ | ✗ | / [l]~[ɾ] dl | | | | ✗ |

| | P | M1 | M2 | L1 | L2 | L3 | L4 | L5 |
|---|---|---|---|---|---|---|---|---|
| G1 | pronoun | 我 | I | /uo214/ [wo˨˩˦] | /gua51/ [gua˥˩] | /ngai11/ [ŋaiɹ] | /ˈai/ [ˈaɪ] | /uatasci/ [wataɕi] |
| G2 | verb | 騎 | ride | /tschi35/ [tɕʰi˧˥] | /khia24/ [kʰia˨˦] | /khi55/ [kʰi˥˥] | /ˈruaid/ [ˈɹʷaɪd] | /noru/ [noɾu] |
| G3 | noun | 腳踏車 | bicycle | /tsciau21tha51tsrhor55/ [tɕiɑʊ˨˩ tʰa˥˩ tʂʰɚ˥˥] | /kha33ta31tschia55/ [kʰa˧˧ta˧˩ tɕʰia˥˥] | /kiok2thap5tsha24/ [kioktʰaptsʰa˨˦] | /ˈbaisirkhl/ [ˈbaɪsɪkʰlʲ] | /djzitensca/ [dʑitencɑ] |
| G4 | verb | 吃 | eat | /tsrhir55/ [tʂʰɚ˥˥] | /tsciah5/ [tɕiaʔ˥] | /sirt55/ [sit˥˥] | /ˈit/ [ˈit] | /tabe↓ru/ [tabe↓ɾu] |

FIG. 4

MULTI-LINGUAL SPEECH RECOGNITION AND THEME-SEMANTEME ANALYSIS METHOD AND DEVICE

BACKGROUND

1. Technical Field

This invention relates to a speech recognition method, and particularly to a multi-lingual speech recognition method.

2. Related Art

The goal of speech recognition technology is to convert human speech content into corresponding sentence. The speech recognition technology has a wide range of applications including voice dialing, voice navigation, indoor device control, dictation data recording and so on. With the development of globalization, the interaction between people of different nationalities is becoming more and more frequent, and there are often mixed expressions in the dialogue. Therefore, the demand for multi-lingual speech recognition devices is increasing. In addition to the challenges of multi-lingual recognition, the user's inaccurate pronunciation will also result in a conversion result obtained by the device that does not conform to the semantic meaning of the user.

SUMMARY

According to one or more embodiment of this disclosure, a multi-lingual speech recognition and theme-semanteme analysis method comprises steps executed by a speech recognizer: obtaining an alphabet string corresponding to a voice input signal according to a pronunciation-alphabet table, determining that the alphabet string corresponds to original words according to a multi-lingual vocabulary, and forming a sentence according to the multi-lingual vocabulary and the original words, and comprises steps executed by a sematic analyzer: according to the sentence and a theme vocabulary-semantic relationship data set, selectively executing a correction procedure to generate a corrected sentence, an analysis state determining procedure or a procedure of outputting the sentence, outputting the corrected sentence when the correction procedure successes, and executing the analysis state determining procedure to selectively output a determined result when the correction procedure fails.

According to one or more embodiment of this disclosure, a multi-lingual speech recognition and theme-semanteme analysis device comprises a voice input interface, an output interface and a processor. The voice input interface is configured to receive a voice input signal. The output interface is configured to output a sentence, the corrected sentence or a determined result. The processor is connected with the voice input interface and the output interface, and comprises a speech recognizer and a sematic analyzer connected with each other. The speech recognizer is configured to obtain an alphabet string corresponding to a voice input signal according to a pronunciation-alphabet table, to determine that the alphabet string corresponds to original words according to a multi-lingual vocabulary, and to form a sentence according to the multi-lingual vocabulary and the original words. The sematic analyzer is configured to selectively execute a correction procedure to generate a corrected sentence, an analysis state determining procedure or a procedure of outputting the sentence according to the sentence and a theme vocabulary-semantic relationship data set, to output the corrected sentence when the correction procedure successes, and to execute the analysis state determining procedure to selectively output a determined result when the correction procedure fails.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 3 is a schematic diagram of the pronunciation-alphabet table according to an embodiment of this invention;

FIG. 4 is a schematic diagram of a multi-lingual vocabulary according to an embodiment of this invention;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
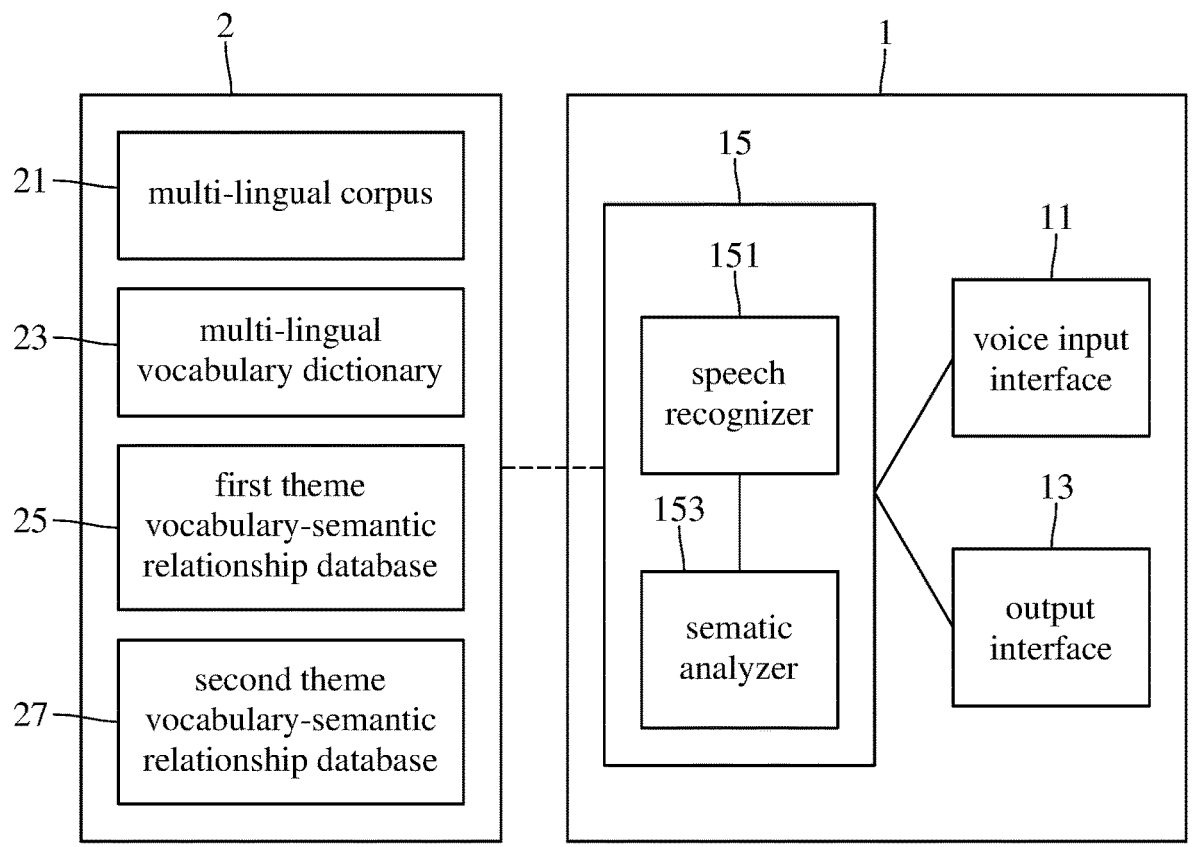
FIG. 1 is a functional block diagram of a multi-lingual speech recognition and theme-semanteme analysis device according to an embodiment of this invention.

Please refer to FIG. 1, which is a functional block diagram of a multi-lingual speech recognition and theme-semanteme analysis device 1 according to an embodiment of this invention. The multi-lingual speech recognition and theme-semanteme analysis device 1 comprises a voice input interface 11, an output interface 13 and a processor 15. The voice input interface 11 is, for example, a sound receiver such as a microphone for receiving a voice input signal, and the voice input signal is formed, for example, by a sound waveform emitted by a user. The output interface 13 is configured to output the sentence corresponding to the voice input signal, wherein the sentence is generated by the processor 15, and the generation method will be described later. For example, the output interface 13 is a display, and display the sentence on the display screen. As another example, the output interface 13 is a wired or wireless connection interface and can be connected with an internal memory of the device or a remote memory which can store the sentence; or, the output interface 13 can be connected with a controller, and the controller can generate a control instruction to control one or more controlled devices, which is an application of voice control.

The processor 15 is, for example, a central processing unit, a microcontroller, a programmable logic controller, etc. The processor is connected with the voice input interface 11 and the output interface 13, and can execute speech recognition and semantic analysis on the voice input signal received by the voice input interface 11, so as to generate the sentence corresponding to the voice input signal. As shown in FIG. 1, the processor 15 can comprise a speech recognizer 151 and a sematic analyzer 153 executing speech recognition and semantic analysis respectively. In an embodiment, the speech recognizer 151 and the sematic analyzer 153 are hardware components (e.g. central processing unit, microcontroller, programmable logic controller, etc.). In another embodiment, the speech recognizer 151 and the sematic analyzer 153 are two pieces of firmware or two pieces of software executed by single hardware (e.g. central processing unit, microcontroller, programmable logic controller, etc.).

As above described, the speech recognizer 151 is configured to execute the speech recognition. In particular, the speech recognizer 151 can obtain an alphabet string corresponding to the voice input signal received by the voice input interface 11 according to a pronunciation-alphabet table, determining that the alphabet string corresponds to multiple original words according to a multi-lingual vocabulary, and forming a sentence according to the multi-lingual vocabulary and the original words. After the speech recognizer 151 completes the speech recognition (i.e. the procedure of forming the sentence based on the voice input signal as described above) to obtain the sentence, the sematic analyzer 153 executes sematic analysis on the sentence. In particular, the sematic analyzer 153 can selectively execute a correction procedure, an analysis state determining procedure, or a procedure of directly outputting the sentence generated by the speech recognizer 151. When the sematic analyzer 153 determines that the correction procedure successes, the sematic analyzer 153 outputs the corrected sentence; when the sematic analyzer 153 determines that the correction procedure fails, the sematic analyzer 153 executes the analysis state determining procedure. The execution content of the correction procedure and the analysis state determining procedure will be described later.

In the embodiment as shown in FIG. 1, the pronunciation-alphabet table, the multi-lingual vocabulary and the theme vocabulary-semantic relationship data set as aforementioned can be stored in the memory 2. The processor 15 can be connected with the memory 2 to obtain the above data to execute speech recognition and semantic analysis. As shown in FIG. 1, the memory 2 can comprise a multi-lingual corpus 21, a multi-lingual vocabulary dictionary 23, the first theme vocabulary-semantic relationship database 25 and a second theme vocabulary-semantic relationship database 27. The multi-lingual corpus 21 stores the pronunciation-alphabet table; the multi-lingual vocabulary dictionary 23 stores the multi-lingual vocabulary; the first theme vocabulary-semantic relationship database 25 stores a theme vocabulary-semantic relationship data set in the first language, such as a Chinese theme vocabulary-semantic relationship data set; the second theme vocabulary-semantic relationship database 27 stores a theme vocabulary-semantic relationship data set in the second language, such as an English theme vocabulary-semantic relationship data set. It should be noted that FIG. 1 exemplarily shows that the memory 2 has two theme vocabulary-semantic relationship databases; however, in other embodiments, the memory 2 can merely have one of the above two theme vocabulary-semantic relationship databases, or have more theme vocabulary-semantic relationship databases in various languages respectively, which is not limited in this invention.

The multi-lingual corpus 21, the multi-lingual vocabulary dictionary 23, the first theme vocabulary-semantic relationship database 25 and the second theme vocabulary-semantic relationship database 27 as aforementioned can be formed by one or more non-volatile storage mediums (e.g. flash memory, read-only memory, magnetic memory, etc.). For example, each of the multi-lingual corpus 21, the multi-lingual vocabulary dictionary 23, the first theme vocabulary-semantic relationship database 25 and the second theme vocabulary-semantic relationship database 27 can be a non-volatile storage medium independently disposed. As another example, the multi-lingual corpus 21, the multi-lingual vocabulary dictionary 23, the first theme vocabulary-semantic relationship database 25 and the second theme vocabulary-semantic relationship database 27 can be different magnetic regions in the same non-volatile storage medium or multiple storage regions defined by a computer program. This invention does not limit the number of the non-volatile storage mediums that form the memory 2, nor does it limit which non-volatile storage medium(s) of the memory 2 stores the pronunciation-alphabet table, the multi-lingual vocabulary and the theme vocabulary-semantic relationship data sets. In the embodiment as shown in FIG. 1, the memory 2 can be a remote memory (e.g. cloud hard disk) that is remote from the multi-lingual speech recognition and theme-semanteme analysis device 1, and have a communication connection with the processor 15. In another embodiment, the memory 2 can be included in the multi-lingual speech recognition and theme-semanteme analysis device 1; that is, the multi-lingual speech recognition and theme-semanteme analysis device 1 can further comprise the memory 2, and the memory 2 can be electrically connected with the processor 15.

Figure 2:
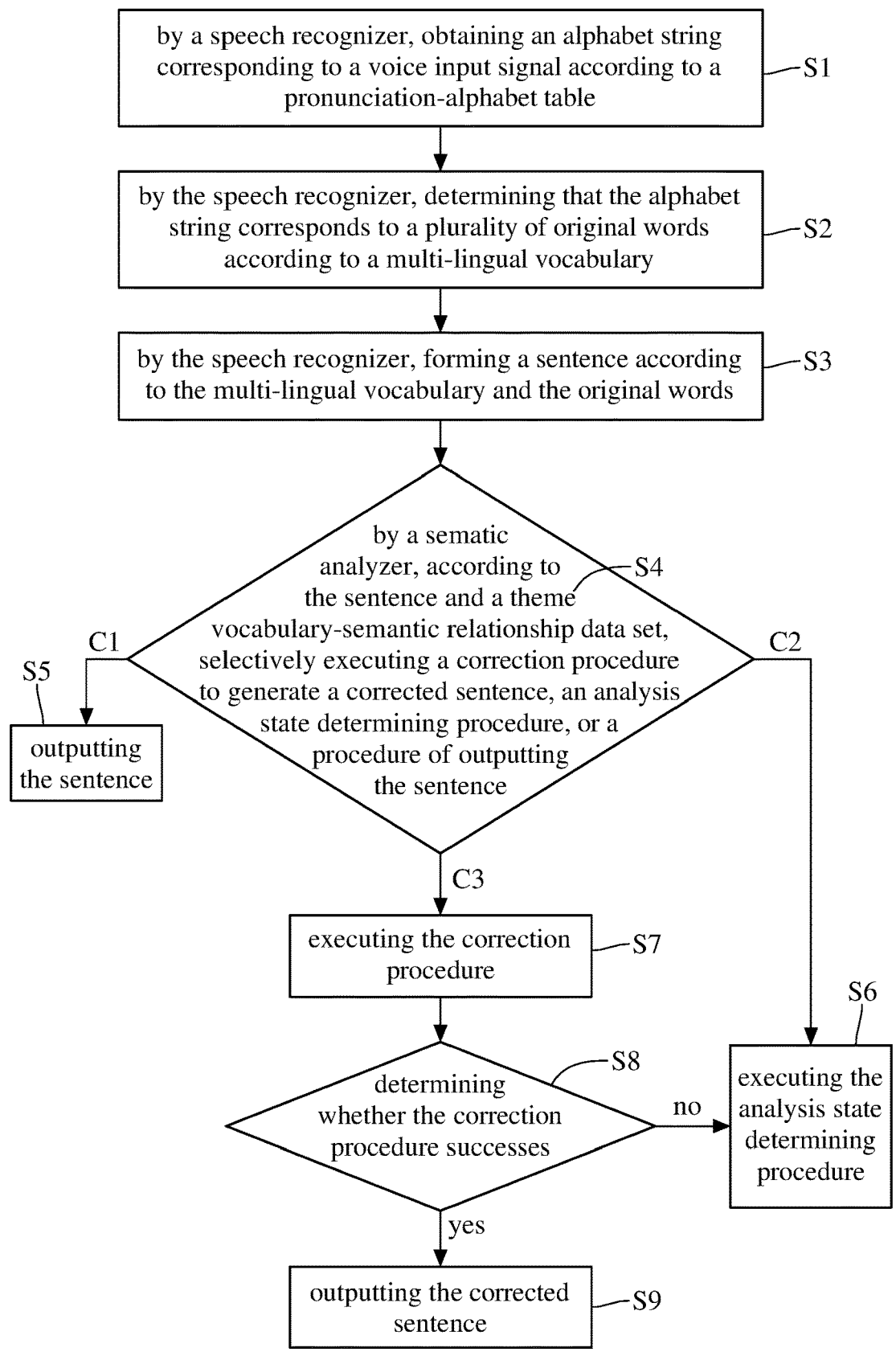
FIG. 2 is a flow chart of a multi-lingual speech recognition and theme-semanteme analysis method according to an embodiment of this invention.

Please refer to FIG. 1 and FIG. 2, wherein FIG. 2 is a flow chart of a multi-lingual speech recognition and theme-semanteme analysis method according to an embodiment of this invention. The multi-lingual speech recognition and theme-semanteme analysis method as shown in FIG. 2 can be applied to the multi-lingual speech recognition and theme-semanteme analysis device 1 as shown in FIG. 1. The following describes multiple implementations of the multi-lingual speech recognition and theme-semanteme analysis method executed by the multi-lingual speech recognition and theme-semanteme analysis device 1. However, the multi-lingual speech recognition and theme-semanteme analysis method of this invention is not limited to being implemented by the device structure shown in FIG. 1.

In step S1, the multi-lingual speech recognition and theme-semanteme analysis device 1 obtains, by the speech recognizer 151, an alphabet string corresponding to a voice input signal according to a pronunciation-alphabet table. In step S2, the multi-lingual speech recognition and theme-semanteme analysis device 1 determines, by the speech recognizer 151, the alphabet string corresponds to a plurality of original words according to a multi-lingual vocabulary. In step S3, the multi-lingual speech recognition and theme-semanteme analysis device 1 forms, by the speech recognizer 151, a sentence according to the multi-lingual vocabulary and the plurality of original words. In step S4, the multi-lingual speech recognition and theme-semanteme analysis device 1 selectively executes, by the sematic analyzer 153, a correction procedure to generate a corrected sentence, an analysis state determining procedure, or a procedure of outputting the sentence according to the sentence and a theme vocabulary-semantic relationship data set. When the analysis result generated by the sematic analyzer 153 according to the theme vocabulary-semantic relationship data set matches condition C1, step S5: outputting the sentence is executed; when the analysis result matches condition C2, step S6: executing the analysis state determining procedure is executed; when the analysis result matches condition C3, step S7: executing the correction procedure is executed. The details of conditions C1-C3 will be described later. After step S7 wherein the correction procedure is executed, in step S8, the multi-lingual speech recognition and theme-sememe analysis device 1 determines, by the sematic analyzer 153, whether the correction procedure successes. When the correction procedure successes, in step S9, the sematic analyzer 153 of the multi-lingual speech recognition and theme-sememe analysis device 1 outputs the corrected sentence to the output interface 13, and the output interface then outputs the corrected sentence (e.g. displaying the corrected sentence on the display screen). When the correction procedure fails, the multi-lingual speech recognition and theme-sememe analysis device 1 executes step S6 to execute the analysis state determining procedure and to selectively output the determined result of the analysis state determining procedure by the sematic analyzer 153. The execution content of the correction procedure and the analysis state determining procedure will be described later.

Further explaining step S1: by the speech recognizer 151, obtaining an alphabet string corresponding to a voice input signal according to a pronunciation-alphabet table, the speech recognizer 151 can determine that the voice received by the voice input interface 11 includes multiple pronunciations, and compare these pronunciations with the pronunciation-alphabet table, so as to obtain the alphabet string corresponding to the voice. More particularly, the pronunciation-alphabet table can include multiple prestored pronunciations and their corresponding alphabets. For example, the alphabets belong to International Phonetic Alphabet (IPA), Taiwanese Romanization System (TL), Hanyu Pinyin or other kinds of alphabets. Please refer to FIG. 3 which is a schematic diagram of the pronunciation-alphabet table according to an embodiment of this invention. The above mentioned pronunciation-alphabet table can be in form of FIG. 3. FIG. 3 mainly uses IPA to arrange TL which can be applied to the multi-lingual speech recognition and correspond to pronunciations. In particular, in the pronunciation-alphabet table shown in FIG. 3, the alphabet recited in "[ ]" belongs to IPA; the alphabet which follows "[ ]" belongs to Commonized Taiwanese Romanization (Common TL); the Common TL alphabet in bold is not included in the original TL; the Common TL alphabet in italics is included in the original TL but was not used to denote the corresponding pronunciation; "(None)" denotes that the corresponding pronunciation is not denoted in Common TL; the alphabets separated by "/" means "voiceless/voiced", and that is, the alphabet to the left of "/" is voiceless, and the right is voiced; the alphabet that is not separated by "/" is voiceless; the field marked with "X" is judged to be impossible to pronounce.

More specifically, the pronunciation-alphabet table shown in FIG. 3 provides at least one specific alphabet group A1 in addition to the alphabets that are included in the Taiwanese Romanization System, wherein the specific alphabet group A1 includes multiple alphabets corresponding to the post-alveolar or the retroflex. More particularly, the specific alphabet group A1 includes the alphabet corresponding to the unaspirated affricate of the post-alveolar or the retroflex, the alphabet corresponding to the aspirated affricate of the post-alveolar or the retroflex, the alphabet corresponding to the fricative of the post-alveolar or the retroflex, and the alphabet corresponding to the approximant of the post-alveolar or the retroflex. More specifically, the above specific alphabet group A1 is closely related to Standard Chinese pronunciations and Hakka pronunciations. By adding the aforementioned specific alphabet group A1 into the existing Taiwanese Romanization System, the multi-lingual speech recognition and theme-sememe analysis method provided in this invention may recognize the pronunciations of Standard Chinese, Taiwanese or Hakka more accurately, and thus improve the accuracy of the speech recognition procedure.

Figure 5:
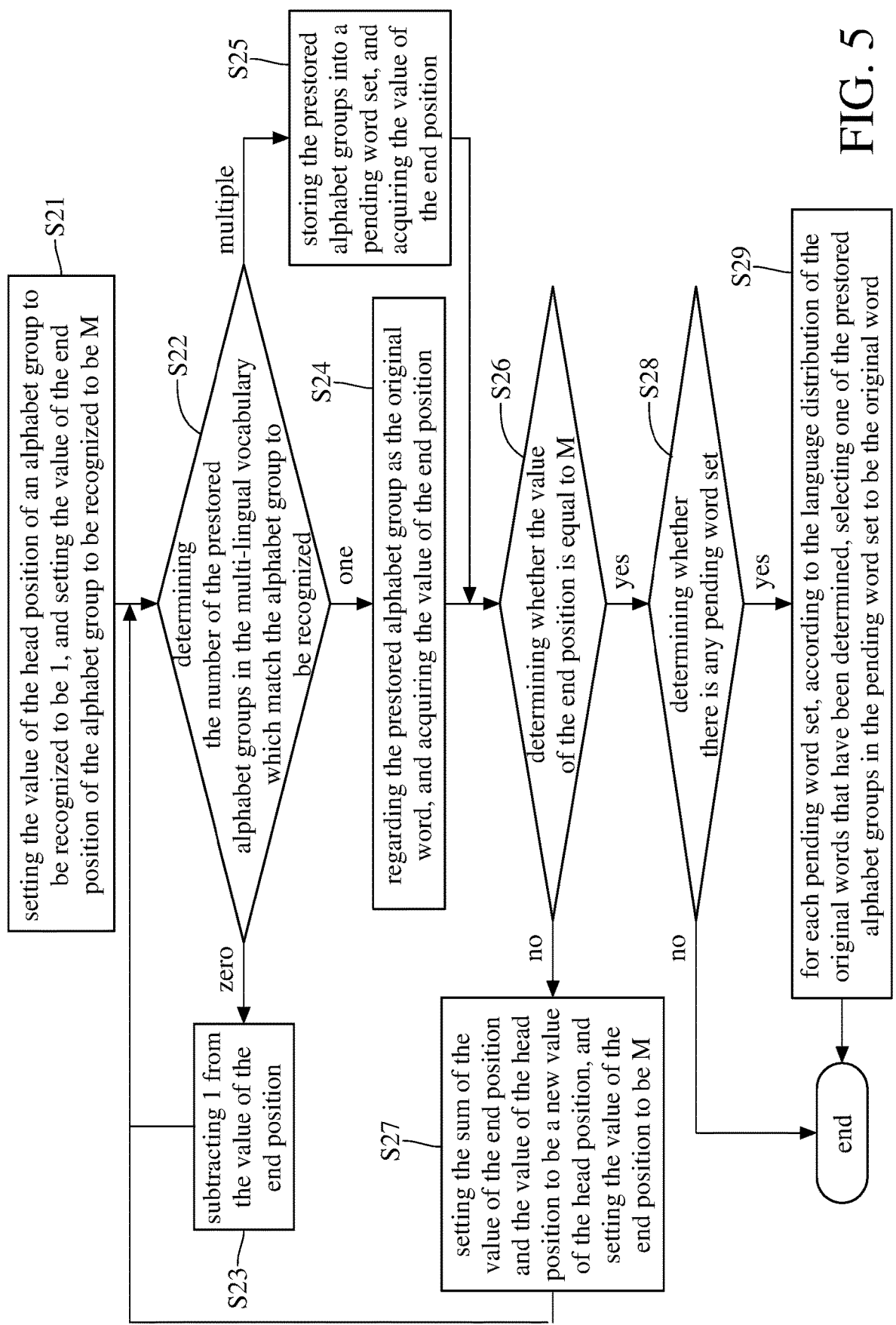
FIG. 5 is a partial flow chart of a multi-lingual speech recognition and theme-semanteme analysis method according to an embodiment of this invention.

Further explaining step S2 in FIG. 2: by the speech recognizer 151, determining that the alphabet string corresponds to a plurality of original words according to a multi-lingual vocabulary, please refer to FIG. 1, FIG. 2, FIG. 4 and FIG. 5, wherein FIG. 4 is a schematic diagram of a multi-lingual vocabulary according to an embodiment of this invention, and FIG. 5 is a partial flow chart of a multi-lingual speech recognition and theme-sememe analysis method according to an embodiment of this invention. The multi-lingual vocabulary provided in this invention can include multiple meaning groups each of which includes at least one word meaning in a specific language and at least one alphabet group in a specific language. As shown in FIG. 4, the multi-lingual vocabulary can include meaning groups G1-G4, wherein each of meaning groups G1, G2, G3 and G4 can include data respectively corresponding to part of speech P, the first language word meaning M1 and the second language word meaning M2, and include alphabet groups (hereafter "prestored alphabet groups") respectively belonging to multiple languages L1-L5. More specifically, the prestored alphabet groups shown in FIG. 4 is formed based on the alphabets shown in FIG. 3. In this embodiment, the first language word meaning M1 indicates the word meaning in Mandarin, the second language word meaning M2 indicates the word meaning in English, and the languages L1-L5 are respectively Standard Chinese, Taiwanese, Hakka, English and Japanese. For example, the prestored alphabet groups [G1, L1], [G1, L2], [G1, L3], [G1, L4] and [G1, L5] respectively denote Standard Chinese pronunciation, Taiwanese pronunciation, Hakka pronunciation, English pronunciation and Japanese pronunciation of the word which means "I". It should be noted that FIG. 4 illustrates that four meaning groups are included in the multi-lingual vocabulary, and each of the meaning groups includes word meanings in two languages and alphabet groups in five languages; however, these number are merely examples, and this invention is not limited to these.

Step S2 shown in FIG. 2 can include steps S21-S29 shown in FIG. 5. In the embodiment of FIG. 5, it assumes that the alphabet string obtained in the aforementioned step S1 is formed by M alphabet, wherein M is a natural number. In step S21, the speech recognizer 151 can firstly set the value of the head position of an alphabet group to be recognized to be 1, and set the value of the end position of the alphabet group to be recognized to be M. In other words, in the beginning of the speech recognition, the speech recognizer 151 can set the $1^{st}$ to $M^{th}$ alphabets of the alphabet string to be the alphabet group to be recognized. Then in step S22, the speech recognizer 151 determines the number of the prestored alphabet groups in the multi-lingual vocabulary which match the alphabet group to be recognized. In particular, the speech recognizer 151 can search the multi-lingual vocabulary for the prestored alphabet groups identical to the alphabet group to be recognized. When the speech recognizer 151 determines that the number of the matching prestored alphabet groups is zero, the speech recognizer 151 executes step S23: subtracting 1 from the value of the end position, and meanwhile, the alphabet group to be recognized is composed of the $1^{st}$ to $(M-1)^{th}$ alphabets. Then, the speech recognizer 151 executes step S22 again. The speech recognizer 151 continuously executes steps S22 and S23 until finding one or more prestored alphabet groups in the multi-lingual vocabulary matching the alphabet group to be recognized.

When the speech recognizer 151 determines there is one prestored alphabet group in the multi-lingual vocabulary matching the alphabet group to be recognized, the speech recognizer 151 executes step S24: regarding the prestored alphabet group as the original word, and acquiring the value of the end position. On the other hand, when the speech recognizer 151 determines there are multiple prestored alphabet groups in multi-lingual vocabulary matching the alphabet group to be recognized, the speech recognizer 151 executes step S25: storing the prestored alphabet groups into a pending word set, and acquiring the value of the end position. In particular, the speech recognizer 151 can further record the values of the head position and the end position corresponding to this pending word set. The pending word set can be stored in a register or the memory 2 included in the processor 15 or connected with the processor 15, which is not limited in this invention.

In step S26, the speech recognizer 151 determines whether the value of the end position is equal to M. When the speech recognizer 151 determines that the value of the end position is not equal to M, indicating that which original words the alphabet string includes have not been determined yet, the speech recognizer 151 executes step S27: setting the sum of the value of the end position and the value of the head position to be a new value of the head position, setting the value of the end position to be M, and then re-executing step S22. For example, when the value of the end position acquired by the speech recognizer 151 in the previous step S24 or S25 is N, indicating that the speech recognizer 151 has determined that the multi-lingual vocabulary includes one or more prestored alphabet groups matching the $1^{st}$ to $N^{th}$ alphabets of the alphabet string, the speech recognizer 151 then searches for the prestored alphabet group matching the $(1+N)^{th}$ to $M^{th}$ alphabets of the alphabet string.

On the other hand, when the speech recognizer 151 determines that the value of the end position is equal to M, indicating that the speech recognizer 151 has determined the original words included in the alphabet string, the speech recognizer 151 can then determine whether there is any pending word set in the register or the memory 2 in step S28. When the speech recognizer 151 determines that there is a pending word set, it indicates that there is an original word in the alphabet string yet to be determined; when the speech recognizer 151 determines that there are multiple pending word sets, it indicates that there are multiple original words in the alphabet string yet to be determined. In these two cases, the speech recognizer 151 executes step S29: for each pending word set, according to the language distribution of the original words that have been determined (hereafter called "the determined original words") in the alphabet string, selecting one of the prestored alphabet groups in the pending word set to be the original word. In particular, when the pending word set stores the prestored alphabet group in the first language and the prestored alphabet group in the second language, and the proportion of the determined original words and belong to the first language is higher, the speech recognizer 151 can select the prestored alphabet group in the first language from the pending word set to be one of the original words for forming the sentence. When the language distribution of the determined original words is uniform, the speech recognizer 151 can firstly select any one of the prestored alphabet group from the pending word set to be the original word, and execute the correction procedure later.

After the speech recognizer 151 completes the selection of the prestored alphabet group from each pending word set to be an original word, all the original words corresponding to the alphabet string may be obtained. Moreover, when the result of the determining step S27 executed by the speech recognizer 151 is negative (i.e. "no"), it indicates that all the original words corresponding to the alphabet string are obtained. By the aforementioned steps, the speech recognizer 151 can determine that the alphabet string is a single original word or divide the alphabet string into multiple original words (i.e. executing word segmentation on the alphabet string). By step S21 and step S27 in which the value of the end position of the alphabet group to be recognized is set to be M, the speech recognizer 151 can execute word segmentation based on the forward longest matching principle. Moreover, the speech recognizer 151 can execute word segmentation based on the backward longest matching principle, NLTK algorithm, Jieba algorithm and so on.

Figure 6:
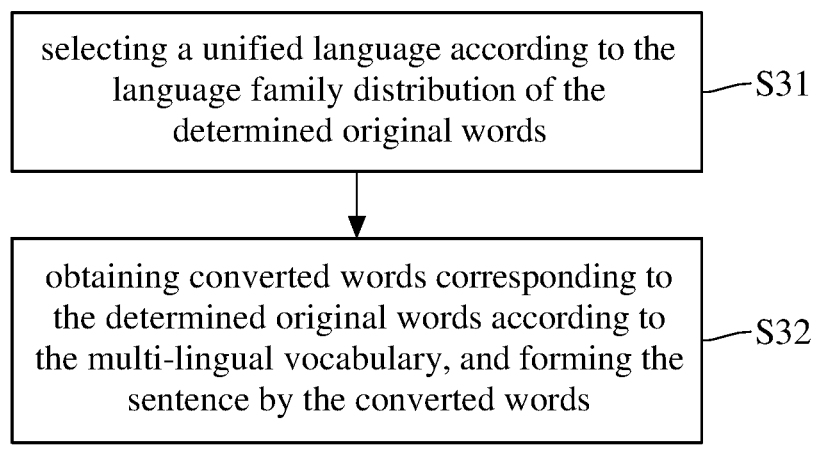
FIG. 6 is a partial flow chart of a multi-lingual speech recognition and theme-semanteme analysis method according to an embodiment of this invention.

Further explaining step S3 in FIG. 2: by the speech recognizer 151, forming a sentence according to the multi-lingual vocabulary and the original words, please refer to FIG. 1, FIG. 2, FIG. 4 and FIG. 6, wherein FIG. 6 is a partial flow chart of a multi-lingual speech recognition and theme-semanteme analysis method according to an embodiment of this invention. In step S31, the speech recognizer 151 can select a unified language according to the language family distribution of the determined original words; in step S32, the speech recognizer 151 obtains converted words corresponding to the determined original words according to the multi-lingual vocabulary, and forms the sentence by the converted words. In particular, the rule in which some specific languages belong to a single language family can be preset in the speech recognizer 151. Taking the multi-lingual vocabulary shown in FIG. 4 as an example, the speech recognizer 151 can be preset to recognize that languages L1-L3 (Standard Chinese, Taiwanese, Hakka) belong to a Chinese language family. If the original words determined in the previous step are: /uo214//khia24//ˈbaisirkhl/, wherein /uo214/ corresponds to language L1 which belongs to the Chinese language family, /khia24/ corresponds to language L2 which also belongs to the Chinese language family, but /ˈbaisirkhl/ corresponds to language L4 which belongs to an English language family, the speech recognizer 151 determines that the proportion of the original words belonging to the Chinese language family is higher so the speech recognizer 151 selects Chinese to be the unified language. The speech recognizer 151 then obtains the word meanings "I", "ride" and "bicycle" respectively correspond to the original words /uo214/, /khia24/ and /ˈbaisirkhl/, and regards these word meanings as converted words, and forms the sentence "I ride bicycle" by these converted words.

Through the foregoing steps S1-S3 in FIG. 2, the speech recognizer 151 of the multi-lingual speech recognition and theme-semanteme analysis device 1 can initially obtain the sentence corresponding to the voice input. Then, the sematic analyzer 153 can selectively execute a correction procedure.

Figure 7:
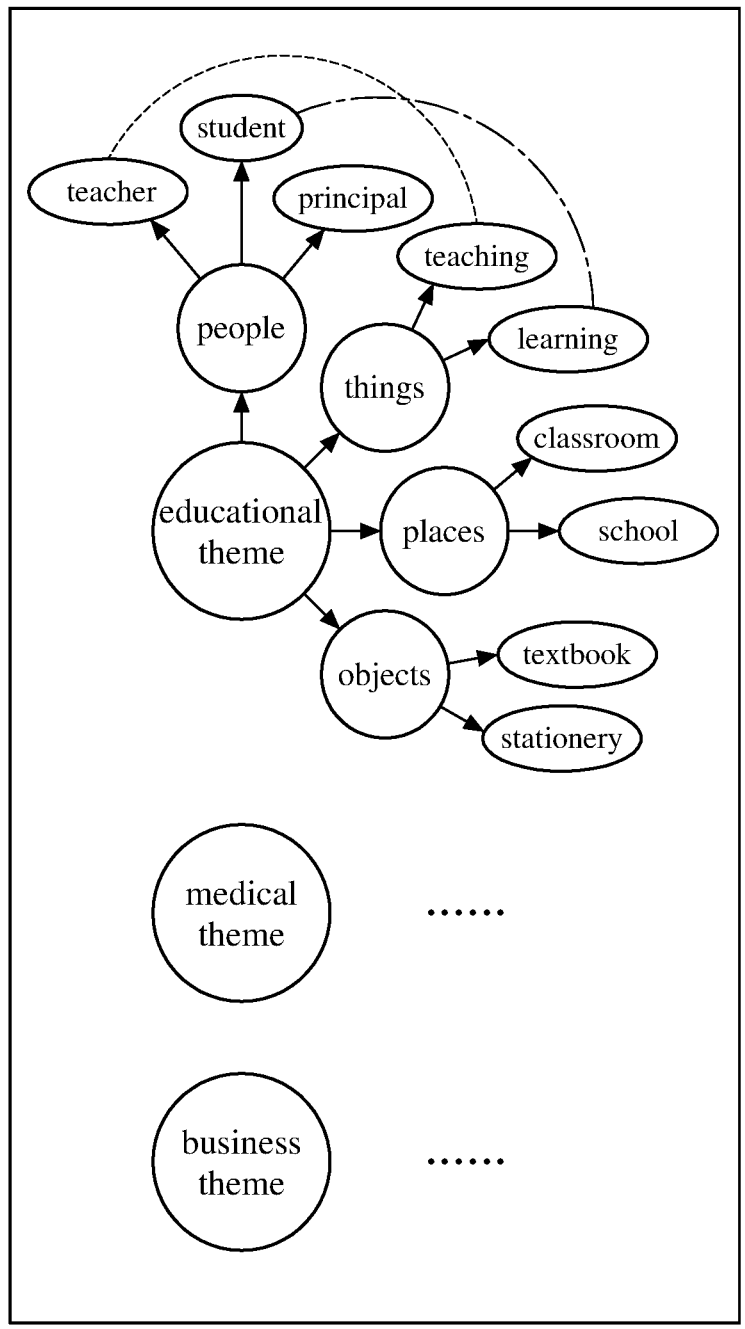
FIG. 7 is a schematic diagram of a theme vocabulary-semantic relationship data set according to an embodiment of this invention.
Figure 8:
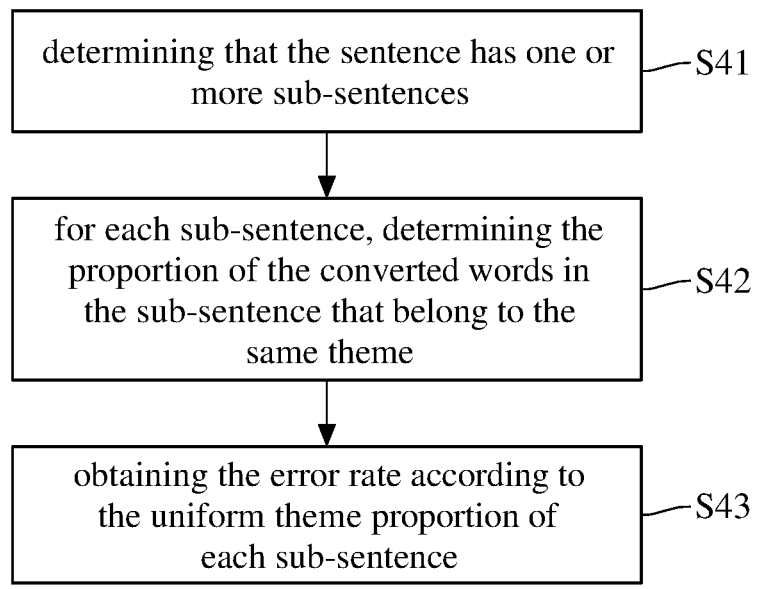
FIG. 8 is a partial flow chart of a multi-lingual speech recognition and theme-semanteme analysis method according to an embodiment of this invention.

Further explaining step S4 in FIG. 2: by the sematic analyzer 153, according to the sentence and a theme vocabulary-semantic relationship data set, selectively executing a correction procedure to generate a corrected sentence, an analysis state determining procedure, or a procedure of outputting the sentence, please refer to FIG. 1, FIG. 2, FIG. 7 and FIG. 8, wherein FIG. 7 is a schematic diagram of a theme vocabulary-semantic relationship data set according to an embodiment of this invention, and FIG. 8 is a partial flow chart of a multi-lingual speech recognition and theme-semanteme analysis method according to an embodiment of this invention. As shown in FIG. 7, the theme vocabulary-semantic relationship data set can include multiple themes such as educational theme, medical theme, business theme and so on. Each of these themes includes categories of people, things, places and objects, and each category includes multiple prestored words. For the educational theme as an example, the category of people can include the prestored words such as "teacher", "student", "principal", etc.; the category of things can include the prestored words such as "teaching", "learning", etc.; the category of places can include the prestored words such as "classroom", "school", etc.; the category of objects can include "textbook", "stationery", etc. The theme vocabulary-semantic relationship data set can also include the relationships between these prestored words, including the relationship between the prestored words of different categories, and these relationships are indicated by the dotted lines in FIG. 7. It should be noted that the theme vocabulary-semantic relationship data set is exemplarily illustrated as FIG. 7, while in other embodiments, the theme vocabulary-semantic relationship data set can include other kinds of themes, and each of these themes can include various categories each of which includes one or more prestored word.

Step S4 in FIG. 2 can include steps S41-S43 shown in FIG. 8. By steps S41-S43, the sematic analyzer 153 can determine an error rate of the converted words in the sentence according to the sentence and the theme vocabulary-semantic relationship data set, wherein the sentence is obtained by the previous speech recognition. In step S41, the sematic analyzer 153 can determine that the sentence has one or more sub-sentences. In particular, the converted words in the sentence previously obtained by the speech recognition 151 according to the multi-lingual vocabulary each has a part of speech. The sematic analyzer 153 can determine that the sentence involves one or more themes based on the part of speech of every converted word. In general, the composition of a sentence is often a verb plus a subject or/and a receiver. Accordingly, the sematic analyzer 153 can determine that the sentence has one or more sub-sentences based on the number of verbs in the sentence. For example, sematic analyzer 153 can set each sub-sentence to contain a verb and a nouns or pronoun before or after the verb. In another embodiment, the sematic analyzer 153 can firstly determine, according to the number of the converted words in the sentence, whether to divide the sentence into sub-sentences based on the part of speech. If the number of the converted words in the sentence is less than a preset number (e.g. 5), the sentence is determined to be a sub-sentence. In yet another embodiment, the sematic analyzer 153 can determine that sentence is formed by a sub-sentence and then execute step S42; that is, the above analysis of part of speech is not executed. The above various rules can be prestored in an internal memory of the device or a remote memory and be obtained and executed by the sematic analyzer 153.

Then in step S42, for each sub-sentence, the sematic analyzer 153 determines the proportion of the converted words in the sub-sentence that belong to the same theme (hereafter called "the uniform theme proportion of the sub-sentence") according to the theme vocabulary-semantic relationship data set. For example, when there are 5 converted words in the sub-sentence and 4 of these converted words belong to the educational theme, the sematic analyzer 153 determines that the uniform theme proportion of the sub-sentence is 80%. In step S43, the sematic analyzer 153 obtains the error rate according to the uniform theme proportion of each sub-sentence. For example, the sematic analyzer 153 can calculate the average of the uniform theme proportions of all sub-sentences, and subtract this average from 100% to obtain the error rate.

As aforementioned, the memory 2 can store multiple theme vocabulary-semantic relationship data sets in different languages (e.g. Chinese theme vocabulary-semantic relationship data set, English theme vocabulary-semantic relationship data set, etc.) In this embodiment, step S4 in FIG. 2 can include a step of selecting one of these prestored theme vocabulary-semantic relationship data sets as a basis for the following analysis. In particular, according to the unified language of the sentence, the sematic analyzer 153 selects the theme vocabulary-semantic relationship data set which belongs to the unified language.

As shown in FIG. 2 and the aforementioned embodiments, the sematic analyzer 153 determines whether the analysis result matches condition C1, condition C2 or condition C3, and selectively execute the procedure of outputting the sentence, the analysis state determining procedure or the correction procedure according to the analysis result. In particular, condition C1 indicates that the error rate of the converted words in the sentence obtained by the sematic analyzer 153 as aforementioned is in the first error rate range; condition C2 indicates the error rate is in the second error rate range; and condition C3 indicates the error rate is in the third error rate range. More particularly, the first error rate range can be set to be less than 20%; the second error rate range can be set to be greater than 40%; and the third error rate range can be set to be 20%-40%. These percentages are merely examples, and they can be adjusted by a user based on the actual requirements and not be limited to the above examples.

When the sematic analyzer 153 determines that the error rate is in the first error rate range, indicating that the correct rate of the sentence generated by the speech recognizer 151 is at a specific level, the sematic analyzer 153 directly outputs the sentence generated by the speech recognizer 151.

When the error rate is in the second error rate range, indicating that the correct rate of the sentence generated by the speech recognizer 151 may be too low to be improved by the correction procedure of the semantic analysis, the sematic analyzer 153 can then execute the analysis state determining procedure. In particular, the analysis state determining procedure comprises: determining whether the number of executions of step S2 (by the speech recognizer 151, determining that the alphabet string corresponds to a plurality of original words according to the multi-lingual vocabulary) exceeds a preset number (e.g. 3), wherein the preset number can be set according to the number of types of word segmentation methods that can be used by the speech recognizer 151, or be set according to the actual requirements; when the number of executions does not exceed the preset number, instructing the speech recognizer 151 to execute step S2 again to obtain alphabet string to re-determine that the alphabet string corresponds to other original words, and adding one to the number of executions; and when the number of executions exceeds the preset number, outputting a failure indicator or a voice input request through the output interface 13, wherein the failure indicator or the voice input request is regarded as the determined result of the analysis state determining procedure. More specifically, the speech recognizer 151 can execute step S2 by the first word segmentation method, and re-execute step S2 by the second word segmentation method that is different from the first word segmentation method.

Figure 9:
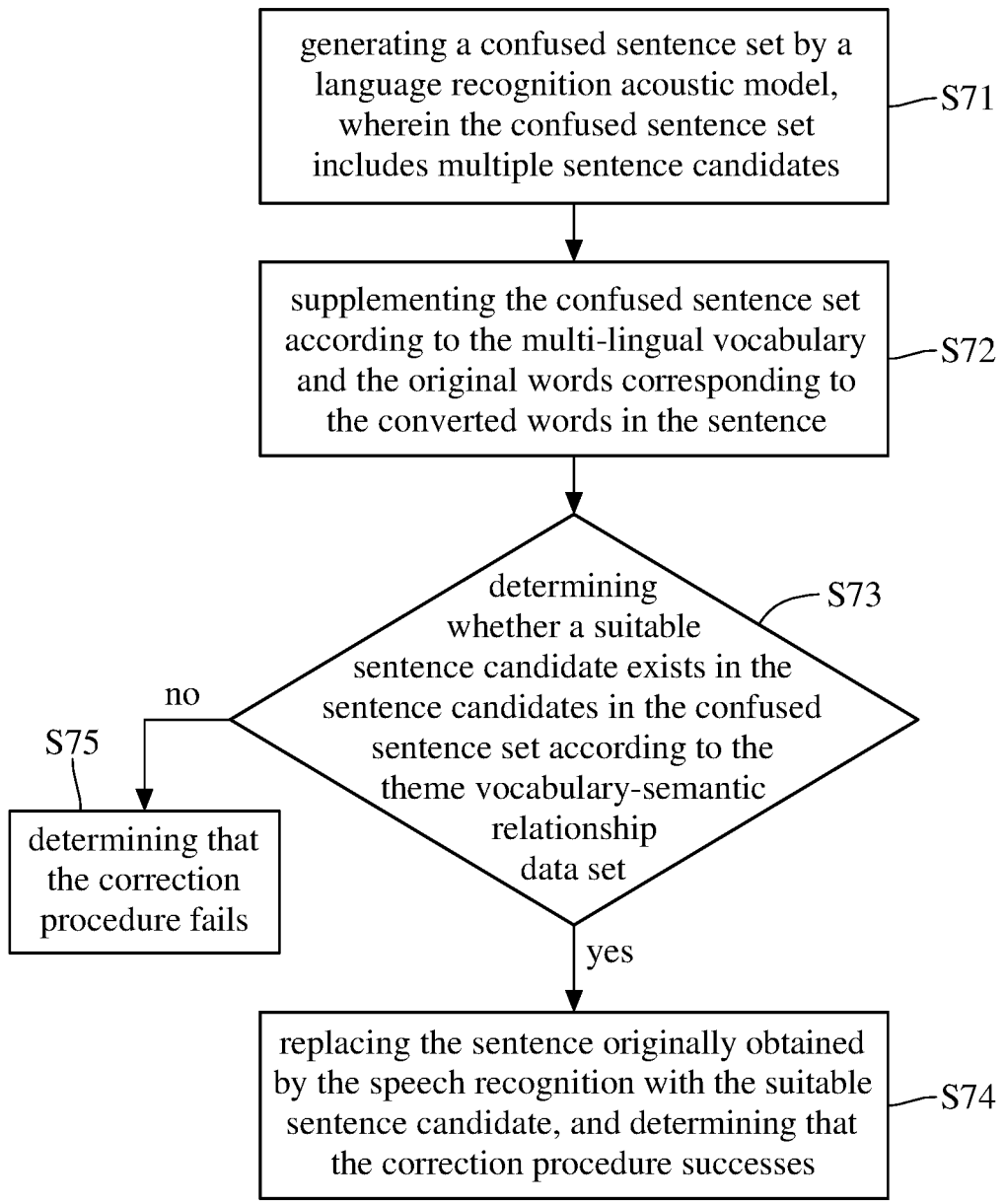
FIG. 9 is a flow chart of a correction procedure of a multi-lingual speech recognition and theme-semanteme analysis method according to an embodiment of this invention.

When the error rate is in the third error rate range, the speech recognizer 151 executes the correction procedure. Please refer to FIG. 1, FIG. 2 and FIG. 9, wherein FIG. 9 is a flow chart of a correction procedure of a multi-lingual speech recognition and theme-semanteme analysis method according to an embodiment of this invention. The correction procedure can include steps S71-S74 shown in FIG. 9. In step S71, the sematic analyzer 153 generates a confused sentence set using an acoustic model for language recognition, wherein the confused sentence set includes multiple sentence candidates. In particular, the language recognition acoustic model can use the N-best search algorithm to obtain one or more sentence candidates corresponding to the original voice input of the sentence and store said one or more sentence candidates into the confused sentence set. For example, the number of the sentence candidates obtained by the N-best search algorithm is five. In step S72, the sematic analyzer 153 supplements the confused sentence set according to the multi-lingual vocabulary and the original words corresponding to the converted words in the sentence. In particular, the sematic analyzer 153 can search the multi-lingual vocabulary for other prestored alphabet groups that are identical or similar to the alphabet groups serving as the original words, and form one or more sentence candidates by these prestored alphabet groups and store said one or more sentence candidates into the confused sentence set. More particularly, the memory 2 or the sematic analyzer 153 can store multiple confusing phonetic relationships, such as the relationship between /tsciah5/ and /khia24/. In this case, besides searching for other prestored alphabet groups that are identical to the alphabet serving as the original words, the sematic analyzer 153 can further search for the prestored alphabet groups having a confusing relationship with the original words.

In step S73, the sematic analyzer 153 determines whether a suitable sentence candidate exists in the sentence candidates in the confused sentence set according to the theme vocabulary-semantic relationship data set. In particular, the suitable sentence candidate refers to the sentence candidate in which the semantic relationship between the words has an error rate less than or equal to a specific rate, wherein the error rate is determined as described in steps S41-S43 of the embodiment of FIG. 8, and is not repeated. For example, the specific rate is 20%. When the sematic analyzer 153 determines that there is a suitable sentence candidate in the confused sentence set, the sematic analyzer 153 executes step S74: replacing the sentence originally obtained by the speech recognition with the suitable sentence candidate, and determining that the correction procedure successes; when the sematic analyzer 153 determines that there is no suitable sentence candidate in the confused sentence set, the sematic analyzer 153 determines that the correction procedure fails. When the correction procedure fails, the sematic analyzer 153 then executes the aforementioned analysis state determining procedure.

In view of the above, the multi-lingual speech recognition and theme-semanteme analysis method and device provided in this disclosure combine specific speech recognition and specific theme-semanteme analysis; thereby, the accuracy of converting the content of voice into the corresponding sentence may be enhanced.

What is claimed is:

1. A multi-lingual speech recognition and theme-semanteme analysis method, comprising:
   by a speech recognizer, obtaining an alphabet string corresponding to a voice input signal according to a pronunciation-alphabet table;
   by the speech recognizer, determining that the alphabet string corresponds to a plurality of original words according to a multi-lingual vocabulary;
   by the speech recognizer, forming a sentence according to the multi-lingual vocabulary and the plurality of original words;
   by a sematic analyzer, according to the sentence and a theme vocabulary-semantic relationship data set, selectively executing a correction procedure to generate a corrected sentence, an analysis state determining procedure, or a procedure of outputting the sentence;
   by the sematic analyzer, when determining that the correction procedure successes, outputting the corrected sentence; and
   by the sematic analyzer, when determining that the correction procedure fails, executing the analysis state determining procedure to selectively output a determined result;
   wherein the sentence comprises a plurality of converted words in a unified language, and the step of according to the sentence and the theme vocabulary-semantic relationship data set, selectively executing the correction procedure to generate the corrected sentence, the analysis state determining procedure, or the procedure of outputting the sentence comprises:
   determining an error rate of the plurality of converted words according to the sentence and the theme vocabulary-semantic relationship data set;
   when the error rate is in a first error rate range, outputting the sentence;
   when the error rate is in a second error rate range, executing the analysis state determining procedure; and
   when the error rate is in a third error rate range, executing the correction procedure;
   wherein the step of determining the error rate of the plurality of converted words according to the sentence and the theme vocabulary-semantic relationship data set comprises determining that the sentence has one or more sub-sentences;
   for each of the one or more sub-sentences, determining a uniform theme proportion of the sub-sentence according to the theme vocabulary-semantic relationship data set; and
   obtaining the error rate according to the uniform theme proportion of each of the one or more sub-sentence.

2. The multi-lingual speech recognition and theme-semanteme analysis method according to claim 1, wherein the step of according to the sentence and the theme vocabulary-semantic relationship data set, selectively executing the correction procedure to generate the corrected sentence, the analysis state determining procedure, or the procedure of outputting the sentence further comprises:
   selecting one of a plurality of prestored theme vocabulary-semantic relationship data sets to serve as the theme vocabulary-semantic relationship data set;
   wherein the plurality of prestored theme vocabulary-semantic relationship data sets respectively correspond to different languages, and the theme vocabulary-semanteme relationship data set corresponds to the unified language.

3. The multi-lingual speech recognition and theme-semanteme analysis method according to claim 1, wherein the correction procedure comprises:
generating a confused sentence set by a language recognition acoustic model, with the confused sentence set comprising a plurality of sentence candidates;
supplementing the confused sentence set according to the plurality of original words and the multi-lingual vocabulary;
according to the theme vocabulary-semantic relationship data set, determining whether a suitable one exists in the plurality of sentence candidates;
when the suitable one exists, replacing the sentence with the suitable one, and determining that the correction procedure successes; and
when no suitable one exists, determining that the correction procedure fails.

4. The multi-lingual speech recognition and theme-semanteme analysis method according to claim 1, wherein the analysis state determining procedure comprises:
determining whether a number of executions of the step of determining that the alphabet string corresponds to the plurality of original words according to the multi-lingual vocabulary by the speech recognizer exceeds a preset number;
when the number of executions does not exceed the preset number, instructing the speech recognizer to re-determine that the alphabet string corresponds to another plurality of original words according to the multi-lingual vocabulary, and adding 1 to the number of executions; and
when the number of executions exceeds the preset number, outputting a failure indicator or a voice input request.

5. The multi-lingual speech recognition and theme-semanteme analysis method according to claim 4, wherein the step of determining that the alphabet string corresponds to the plurality of original words according to the multi-lingual vocabulary is executed by a first word segmentation method, and the step of re-determining that the alphabet string corresponds to the another plurality of original words according to the multi-lingual vocabulary is executed by a second word segmentation method which is different from the first word segmentation method.

6. The multi-lingual speech recognition and theme-semanteme analysis method according to claim 1, wherein the step of forming the sentence according to the multi-lingual vocabulary and the plurality of original words comprises:
selecting a unified language according to a language family distribution of the plurality of original words; and
according to the multi-lingual vocabulary, obtaining a plurality of converted words respectively corresponding to the plurality of original words, and forming the sentence by the plurality of converted words;
wherein the converted words belong to the unified language.

7. The multi-lingual speech recognition and theme-semanteme analysis method according to claim 1, wherein the alphabet string comprises M alphabets, and the step of determining that the alphabet string corresponds to the plurality of original words according to the multi-lingual vocabulary comprises:

setting an alphabet group to be recognized in the alphabet string, with the alphabet group to be recognized having a head position and an end position;
setting a value of the head position to be 1, and setting a value of the end position to be M;
determining a number of prestored alphabet groups, which match the alphabet group, in the multi-lingual vocabulary;
when the number is zero, subtracting 1 from the value of the end position, and re-executing the step of determining the number of prestored alphabet groups, which match the alphabet group, in the multi-lingual vocabulary;
when the number is one, regarding the prestored alphabet group as one of the plurality of original words; and
when the number is more than one, storing the prestored alphabet groups into a pending word set.

8. The multi-lingual speech recognition and theme-semanteme analysis method according to claim 7, wherein the step of determining that the alphabet string corresponds to the plurality of original words according to the multi-lingual vocabulary further comprises:
according to a language distribution of the determined original words in the alphabet string, selecting one of the prestored alphabet groups in the pending word set to be another one of the plurality of original words.

9. A multi-lingual speech recognition and theme-semanteme analysis method, comprising:
by a speech recognizer, obtaining an alphabet string corresponding to a voice input signal according to a pronunciation-alphabet table;
by the speech recognizer, determining that the alphabet string corresponds to a plurality of original words according to a multi-lingual vocabulary;
by the speech recognizer, forming a sentence according to the multi-lingual vocabulary and the plurality of original words;
by a sematic analyzer, according to the sentence and a theme vocabulary-semantic relationship data set, selectively executing a correction procedure to generate a corrected sentence, an analysis state determining procedure, or a procedure of outputting the sentence;
by the sematic analyzer, when determining that the correction procedure successes, outputting the corrected sentence; and
by the sematic analyzer, when determining that the correction procedure fails, executing the analysis state determining procedure to selectively output a determined result;
wherein the alphabet string comprises M alphabets, and the step of determining that the alphabet string corresponds to the plurality of original words according to the multi-lingual vocabulary comprises:
setting an alphabet group to be recognized in the alphabet string, with the alphabet group to be recognized having a head position and an end position;
setting a value of the head position to be 1, and setting a value of the end position to be M;
determining a number of prestored alphabet groups, which match the alphabet group, in the multi-lingual vocabulary;
when the number is zero, subtracting 1 from the value of the end position, and re-executing the step of determining the number of prestored alphabet groups, which match the alphabet group, in the multi-lingual vocabulary;

when the number is one, regarding the prestored alphabet group as one of the plurality of original words; and when the number is more than one, storing the prestored alphabet groups into a pending word set;

wherein the step of determining that the alphabet string corresponds to the plurality of original words according to the multi-lingual vocabulary further comprises:

when the number is one or more, further determining whether the value of the end position is equal to M; and when the value of the end position is not equal to M, setting a sum of the value of the end position and the value of the head position to be a new value of the head position, setting the value of the end position to be M, and re-executing the step of determining the number of prestored alphabet groups, which match the alphabet group, in the multi-lingual vocabulary.

10. A multi-lingual speech recognition and theme-semanteme analysis device, comprising:

a voice input interface configured to receive a voice input signal;

an output interface configured to output a sentence, a corrected sentence or a determined result; and a processor connected with the voice input interface and the output interface, and comprising:

a speech recognizer configured to obtain an alphabet string corresponding to a voice input signal according to a pronunciation-alphabet table, to determine that the alphabet string corresponds to a plurality of original words according to a multi-lingual vocabulary, and to form a sentence according to the multi-lingual vocabulary and the plurality of original words; and a sematic analyzer connected with the speech recognizer, and configured to selectively execute a correction procedure to generate a corrected sentence, an analysis state determining procedure or a procedure of outputting the sentence according to the sentence and a theme vocabulary-semantic relationship data set, to output the corrected sentence when the correction procedure successes, and to execute the analysis state determining procedure to selectively output a determined result when the correction procedure fails;

wherein the sentence comprises a plurality of converted words in a unified language, and the step of selectively execute a correction procedure to generate a corrected sentence, an analysis state determining procedure or a procedure of outputting the sentence according to the sentence and a theme vocabulary-semantic relationship data set executed by the sematic analyzer comprises:

determining an error rate of the plurality of converted words according to the sentence and the theme vocabulary-semantic relationship data set;

when the error rate is in a first error rate range, outputting the sentence;

when the error rate is in a second error rate range, executing the analysis state determining procedure; and when the error rate is in a third error rate range, executing the correction procedure;

wherein the step of determining the error rate of the plurality of converted words according to the sentence and the theme vocabulary-semantic relationship data set executed by the sematic analyzer comprises:

determining that the sentence has one or more sub-sentences;

for each of the one or more sub-sentences, determining a uniform theme proportion of the sub-sentence according to the theme vocabulary-semantic relationship data set; and obtaining the error rate according to the uniform theme proportion of each of the one or more sub-sentence.

11. The multi-lingual speech recognition and theme-semanteme analysis device according to claim 10, further comprising a memory, wherein the memory is electrically connected with the processor, and stores the pronunciation-alphabet table, the multi-lingual vocabulary and the theme vocabulary-semantic relationship data set.

12. The multi-lingual speech recognition and theme-semanteme analysis device according to claim 10, wherein the processor is configured to have a communication connection with a memory, and to obtain the pronunciation-alphabet table, the multi-lingual vocabulary and the theme vocabulary-semantic relationship data set from the memory.

13. The multi-lingual speech recognition and theme-semanteme analysis device according to claim 10, wherein the step of selectively execute a correction procedure to generate a corrected sentence, an analysis state determining procedure or a procedure of outputting the sentence according to the sentence and a theme vocabulary-semantic relationship data set executed by the sematic analyzer further comprises:

selecting one of a plurality of prestored theme vocabulary-semantic relationship data sets to serve as the theme vocabulary-semantic relationship data set, wherein the plurality of prestored theme vocabulary-semantic relationship data sets respectively correspond to different languages, and the theme vocabulary-semantic relationship data set corresponds to the unified language.

14. The multi-lingual speech recognition and theme-semanteme analysis device according to claim 10, wherein the correction procedure executed by the sematic analyzer comprises:

generating a confused sentence set by a language recognition acoustic model, with the confused sentence set comprising a plurality of sentence candidates;

supplementing the confused sentence set according to the plurality of original words and the multi-lingual vocabulary;

according to the theme vocabulary-semantic relationship data set, determining whether a suitable one exists in the plurality of sentence candidates;

when the suitable one exists, replacing the sentence with the suitable one, and determining that the correction procedure successes; and when no suitable one exists, determining that the correction procedure fails.

15. The multi-lingual speech recognition and theme-semanteme analysis device according to claim 10, wherein the analysis state determining procedure executed by the sematic analyzer comprises:

determining whether a number of executions of the step of determining that the alphabet string corresponds to the plurality of original words according to the multi-lingual vocabulary by the speech recognizer exceeds a preset number;

when the number of executions does not exceed the preset number, instructing the speech recognizer to re-determine that the alphabet string corresponds to another plurality of original words according to the multi-lingual vocabulary, and adding 1 to the number of executions; and when the number of executions exceeds the preset number, outputting a failure indicator or a voice input request.

16. The multi-lingual speech recognition and theme-semanteme analysis device according to claim 15, wherein the speech recognizer executes the step of determining that the alphabet string corresponds to the plurality of original words according to the multi-lingual vocabulary by a first word segmentation method, and executes the step of re-determining that the alphabet string corresponds to the another plurality of original words according to the multi-lingual vocabulary by a second word segmentation method which is different from the first word segmentation method.

17. A multi-lingual speech recognition and theme-semanteme analysis device, comprising:
    a voice input interface configured to receive a voice input signal;
    an output interface configured to output a sentence, a corrected sentence or a determined result; and
    a processor connected with the voice input interface and the output interface, and comprising:
        a speech recognizer configured to obtain an alphabet string corresponding to a voice input signal according to a pronunciation-alphabet table, to determine that the alphabet string corresponds to a plurality of original words according to a multi-lingual vocabulary, and to form a sentence according to the multi-lingual vocabulary and the plurality of original words; and
        a sematic analyzer connected with the speech recognizer, and configured to selectively execute a correction procedure to generate a corrected sentence, an analysis state determining procedure or a procedure of outputting the sentence according to the sentence and a theme vocabulary-semantic relationship data set, to output the corrected sentence when the correction procedure successes, and to execute the analysis state determining procedure to selectively output a determined result when the correction procedure fails;
    wherein the alphabet string comprises M alphabets, and the step of determining that the alphabet string corresponds to the plurality of original words according to the multi-lingual vocabulary performed by the speech recognizer comprises:
    setting an alphabet group to be recognized in the alphabet string, with the alphabet group to be recognized having a head position and an end position;
    setting a value of the head position to be 1, and setting a value of the end position to be M;
    determining a number of prestored alphabet groups, which match the alphabet group, in the multi-lingual vocabulary;
    when the number is zero, subtracting 1 from the value of the end position, and re-executing the step of determining the number of prestored alphabet groups, which match the alphabet group, in the multi-lingual vocabulary;
    when the number is one, regarding the prestored alphabet group as one of the plurality of original words; and
    when the number is more than one, storing the prestored alphabet groups into a pending word set;
    wherein the step of determining that the alphabet string corresponds to the plurality of original words according to the multi-lingual vocabulary further comprises:
    when the number is one or more, further determining whether the value of the end position is equal to M; and
    when the value of the end position is not equal to M, setting a sum of the value of the end position and the value of the head position to be a new value of the head position, setting the value of the end position to be M, and re-executing the step of determining the number of prestored alphabet groups, which match the alphabet group, in the multi-lingual vocabulary.

* * * * *